United States Patent
Klas et al.

(10) Patent No.: US 7,681,686 B1
(45) Date of Patent: Mar. 23, 2010

(54) OPERATOR CONTROL FOR SIMULTANEOUS MOVEMENT OF A MULTIFUNCTION MACHINE

(75) Inventors: David Joseph Klas, New Vienna, IA (US); Robert Scott Tyler, Platteville, WI (US); Joshua Joe Stephens, Cuba City, WI (US); Leonard Keith Mast, Platteville, WI (US); Donald Joseph Bagby, Dubuque, IA (US)

(73) Assignee: Deere & Company, Moline, IL (US)

( * ) Notice: Subject to any disclaimer, the term of this patent is extended or adjusted under 35 U.S.C. 154(b) by 296 days.

(21) Appl. No.: 11/520,947

(22) Filed: Sep. 14, 2006

(51) Int. Cl.
*B60K 26/00* (2006.01)
(52) U.S. Cl. .................. 180/331; 180/329; 180/333
(58) Field of Classification Search ................ 180/315, 180/326, 329, 330, 331, 333, 324
See application file for complete search history.

(56) References Cited

U.S. PATENT DOCUMENTS

| | | | |
|---|---|---|---|
| 3,223,193 A * | 12/1965 | Reynolds et al. ............ | 180/329 |
| 3,257,013 A | 6/1966 | Arnold | |
| 3,515,432 A | 6/1970 | Sporman | |
| 4,026,379 A | 5/1977 | Dunn et al. | |
| 4,278,144 A | 7/1981 | Perin | |
| 4,487,445 A | 12/1984 | Jonnston | |
| 4,869,337 A * | 9/1989 | Wagner ....................... | 180/330 |
| 4,934,462 A | 6/1990 | Tatara et al. | |
| 4,949,805 A * | 8/1990 | Mather et al. ............... | 180/333 |
| 5,052,512 A | 10/1991 | Pakosh et al. | |
| 5,086,869 A | 2/1992 | Newbery et al. | |
| 5,664,909 A | 9/1997 | Lindgren et al. | |
| H1822 H | 12/1999 | Kelley et al. | |
| 6,276,749 B1 | 8/2001 | Okazawa et al. | |
| 6,564,896 B1 * | 5/2003 | Proksch et al. ............. | 180/326 |
| 6,643,577 B1 | 11/2003 | Padgett et al. | |
| 6,694,240 B1 | 2/2004 | Swick et al. | |
| 6,711,839 B1 * | 3/2004 | Kawamura et al. .......... | 37/466 |
| 7,036,248 B2 | 5/2006 | Meyeres et al. | |
| 7,059,680 B2 * | 6/2006 | Billger et al. .......... | 297/344.22 |
| 7,121,608 B2 * | 10/2006 | Billger et al. ............ | 296/65.06 |
| 7,243,756 B2 * | 7/2007 | Muraro ....................... | 180/326 |
| 7,334,658 B2 * | 2/2008 | Berg et al. .................. | 180/333 |
| 7,347,299 B2 * | 3/2008 | Billger et al. ............... | 180/326 |
| 2006/0144634 A1 * | 7/2006 | Portscheller et al. ........ | 180/330 |
| 2007/0074923 A1 * | 4/2007 | Billger et al. ............... | 180/330 |

FOREIGN PATENT DOCUMENTS

GB 2 099 767 A 12/1992

* cited by examiner

*Primary Examiner*—Paul N. Dickson
*Assistant Examiner*—Drew J. Brown
(74) *Attorney, Agent, or Firm*—Baker & Daniels LLP

(57) ABSTRACT

A mobile vehicle is disclosed which includes a plurality of proportional controls to control the operation of a first set of equipment and a second set of equipment.

21 Claims, 13 Drawing Sheets

OPERATOR CONTROL FOR SIMULTANEOUS MOVEMENT OF A MULTIFUNCTION MACHINE

RELATED APPLICATIONS

This application is related to U.S. patent application Ser. No. 11/521,054, filed Sep. 14, 2006, titled "MACHINE CONTROL INTERLOCKS FOR AN ELECTROHYDRAULICALLY CONTROLLED VEHICLE", the disclosure of which is expressly incorporated by reference herein.

BACKGROUND OF THE INVENTION

The present invention relates generally to controls for controlling the operation of equipment on a movable vehicle. More particularly, the present invention relates to controls for controlling the operation of equipment, such as a loader and a backhoe, on a movable vehicle, such as a backhoe loader.

It is known to provide proportional controls, such as joysticks, to control the operation of equipment associated with a movable vehicle, such as a loader or backhoe on a backhoe loader. U.S. Pat. Nos. 4,934,462 and 6,643,577 are two examples. In addition, it is known in the aircraft industry to provide a miniature proportional control as apart of another proportional control.

SUMMARY OF THE INVENTION

In an exemplary embodiment of the present invention, a moveable vehicle is provided. The moveable vehicle including a first set of equipment positioned proximate a front portion of the moveable vehicle and a second set of equipment positioned proximate to a rear portion of the moveable vehicle. The moveable vehicle comprising a movable operator seat movable between a forward facing position facing the front portion of the moveable vehicle and a rearward facing position facing the rear portion of the moveable vehicle; a first proportional control moveable with the operator seat; a second proportional control moveable with the operator seat; a third proportional control moveable with the operator seat; and a controller coupled to the first proportional control, the second proportional control, and the third proportional control. The first proportional control and the second proportional control operating the second set of equipment positioned proximate the rear portion of the moveable vehicle and the third proportional control operating the first set of equipment positioned proximate the front portion of the moveable vehicle in a first operating mode.

In another exemplary embodiment of the present invention, a moveable vehicle is provided. The moveable vehicle including a first set of equipment positioned proximate a front portion of the moveable vehicle and a second set of equipment positioned proximate to a rear portion of the moveable vehicle. The moveable vehicle comprising a movable operator seat movable between a forward facing position facing the front portion of the moveable vehicle and a rearward facing position facing the rear portion of the moveable vehicle; a plurality of proportional controls movable with the operator seat and configured to control the operation of the first set of equipment and the second set of equipment, the plurality of proportional controls including a first proportional control and a second proportional control; and a controller coupled to the plurality of proportional controls. The controller having a first mode of operation wherein the first proportional control controls a first group of functions of the first set of equipment. The controller having a second mode of operation wherein the first proportional control and the second proportional control a second group of functions of the second set of equipment. The controller having a third mode of operation wherein the plurality of proportional controls are configured to control both the first set of equipment and the second set of equipment and to maintain the complete functionality controlled by the first proportional control in the first mode of operation and the second mode of the operation and the complete functionality controlled by the second proportional control in the second mode of the operation.

In a further exemplary embodiment of the present invention, a moveable vehicle is provided. The moveable vehicle including a first set of equipment positioned proximate a front portion of the moveable vehicle and a second set of equipment positioned proximate to a rear portion of the moveable vehicle. The moveable vehicle comprising a movable operator seat movable between a forward facing position facing the front portion of the moveable vehicle and a rearward facing position facing the rear portion of the moveable vehicle; a joystick movable with the operator seat, the joystick including a hand grip portion and an input positioned on a front side of the joystick; and a controller operably coupled to the joystick. The controller configured to control the operation of the first set of equipment and the second set of equipment. The controller assigning a first function to the input when the moveable operator seat is in a first position, the first position being a forward facing position, and assigning a second function to the input when the moveable operator seat is in a second position, the second position being a rearward facing position.

In yet another exemplary embodiment of the present invention, a moveable vehicle is provided. The moveable vehicle comprising a frame; a plurality of traction devices; a first set of equipment positioned proximate a front portion of the moveable vehicle; a second set of equipment positioned proximate to a rear portion of the moveable vehicle; and a control system. The control system including a controller configured to control the movement of the first set of equipment and the second set of equipment and a plurality of proportional controls actuatable by a user to control the operation of the first set of equipment and the second set of equipment. The plurality of proportional controls being operatively coupled to the controller and including a first proportional control and a second proportional control, the second proportional control being moveable with the first proportional control.

In yet a further exemplary embodiment of the present invention, a moveable vehicle is provided. The moveable vehicle including a first set of equipment positioned proximate a front portion of the moveable vehicle and a second set of equipment positioned proximate to a rear portion of the moveable vehicle. The moveable vehicle comprising a frame; a plurality of traction devices; a left side stabilizer coupled to the frame and moveable between a lowered position and a raised position; a right side stabilizer coupled to the frame and moveable between a lowered position and a raised position; a movable operator seat movable between a forward facing position facing a front portion of the moveable vehicle and a rearward facing position facing a rear portion of the moveable vehicle; and a control system configured to control the movement of the left side stabilizer and the right side stabilizer. The control system including a first stabilizer input and a second stabilizer input. The first stabilizer input being operatively coupled to the left side stabilizer when the operator seat is in the forward-facing position and being operatively coupled to the right side stabilizer when the operator seat is in the rearward facing position.

In still another exemplary embodiment of the present invention, a moveable vehicle is provided. The moveable vehicle including a first set of equipment positioned proximate a front portion of the moveable vehicle and a second set of equipment positioned proximate to a rear portion of the moveable vehicle. The moveable vehicle comprising a movable operator seat movable between a forward facing position facing the front portion of the moveable vehicle and a rearward facing position facing the rear portion of the moveable vehicle; a plurality of proportional controls movable with the operator seat and configured to control the operation of the first set of equipment and the second set of equipment, the plurality of proportional controls including a first proportional control and a second proportional control; and a controller coupled to the plurality of proportional controls. The controller enabling the plurality of proportional controls to control the second set of equipment when the moveable operator seat is in a rearward facing position. The controller storing a value of an operational parameter set by the operator while the plurality of proportional controls are enabled. The controller automatically setting the operational parameter to the stored value upon a subsequent re-enablement of the plurality of proportional controls in the absent of a timeout having occurred.

In still a further exemplary embodiment of the present invention, a moveable vehicle is provided. The moveable vehicle including a first set of equipment positioned proximate a front portion of the moveable vehicle and a second set of equipment positioned proximate to a rear portion of the moveable vehicle. The moveable vehicle comprising a movable operator seat movable between a forward facing position facing the front portion of the moveable vehicle and a rearward facing position facing the rear portion of the moveable vehicle; a controller configured to determine if the moveable operator seat is in one of a forward center position and a rear position; and a plurality of seat inputs each of which provides an indication to the controller of the position of the moveable operator seat, wherein at least two seat inputs each provide an indication that the moveable operator seat is in the forward center position and another seat input provides an indication that the moveable operator seat is in the rear position.

In yet still another exemplary embodiment of the present invention, a method of operating a moveable vehicle including a moveable operator seat and a plurality of proportional controls to control the operation of a first set of equipment positioned proximate to a front portion of the moveable vehicle and a second set of equipment positioned proximate to a rear portion of the moveable vehicle is provided. The method comprising the steps of: activating a first mode of operation wherein at least one of the plurality of proportional controls controls the first set of equipment when the operator seat is in a first position; activating a second mode of operation wherein at least two of the plurality of proportional controls the second set of equipment when the operator seat is in a second position; and activating a third mode of operation wherein a first proportional control controls the first set of equipment and a second proportional control and a third proportional control the second set of equipment simultaneously.

In yet still a further exemplary embodiment of the present invention, a method of operating a moveable vehicle including a first set of equipment positioned proximate a front portion of the moveable vehicle and a second set of equipment positioned proximate to a rear portion of the moveable vehicle is provided. The method comprising the steps of: providing a moveable operator seat and a plurality of proportional controls supported by the moveable operator seat for travel with the moveable operator seat; providing a first mode of operation wherein the plurality of proportional controls are enabled to control a first set of functions related to the first set of equipment; providing a second mode of operation wherein the plurality of proportional controls are enabled to control a second set of functions related to the second set of equipment; and providing a third mode of operation wherein the plurality of proportional controls are enabled to control both the first set of equipment and the second set of equipment and to maintain the complete functionality controlled by the plurality of proportional controls in the first mode of operation and the second mode of the operation.

In yet further still another exemplary embodiment of the present invention, a method of moving a moveable vehicle onto a trailer is provided. The moveable vehicle including a loader positioned proximate a front portion of the moveable vehicle and a backhoe positioned proximate to a rear portion of the moveable vehicle. The method comprising the steps of: providing a moveable operator seat and a plurality of proportional controls for travel with the moveable operator seat, the plurality of proportional controls controlling the loader and the backhoe; placing the loader on the trailer; raising the front portion of moveable vehicle through the plurality of proportional controls by actuating the loader; advancing the moveable vehicle towards trailer; and raising the rear portion of the moveable vehicle through the plurality of proportional controls by actuating the backhoe.

In yet further still a further exemplary embodiment of the present invention, a method of operating a moveable vehicle including a first set of equipment positioned proximate a front portion of the moveable vehicle and a second set of equipment positioned proximate to a rear portion of the moveable vehicle is provided. The method comprising the steps of: providing a moveable operator seat and a plurality of proportional controls supported by the moveable operator seat for travel with the moveable operator seat; determining based on inputs from a plurality of seat inputs a position of the moveable operator seat; enabling a first mode of operation wherein the plurality of proportional controls are enabled to control a first set of functions related to the first set of equipment, in response to receiving an indication that an enable input has been actuated, receiving an indication from a first seat input that the moveable operator seat is in the forward center position, receiving an indication from a second seat input that the moveable operator seat is in the forward center position, and receiving an indication that a door of the vehicle is closed; and enabling a second mode of operation wherein the plurality of proportional controls are enabled to control a second set of functions related to the second set of equipment in response to receiving an indication that an enable input has been actuated and receiving an indication that the moveable operator seat is in a rear position.

Additional features of the present invention will become apparent to those skilled in the art upon consideration of the following detailed description of the presently perceived best mode of carrying out the invention.

BRIEF DESCRIPTION OF THE DRAWINGS

The detailed description of the drawings particularly refers to the accompanying figures in which.

DETAILED DESCRIPTION OF THE DRAWINGS

Figure 1:
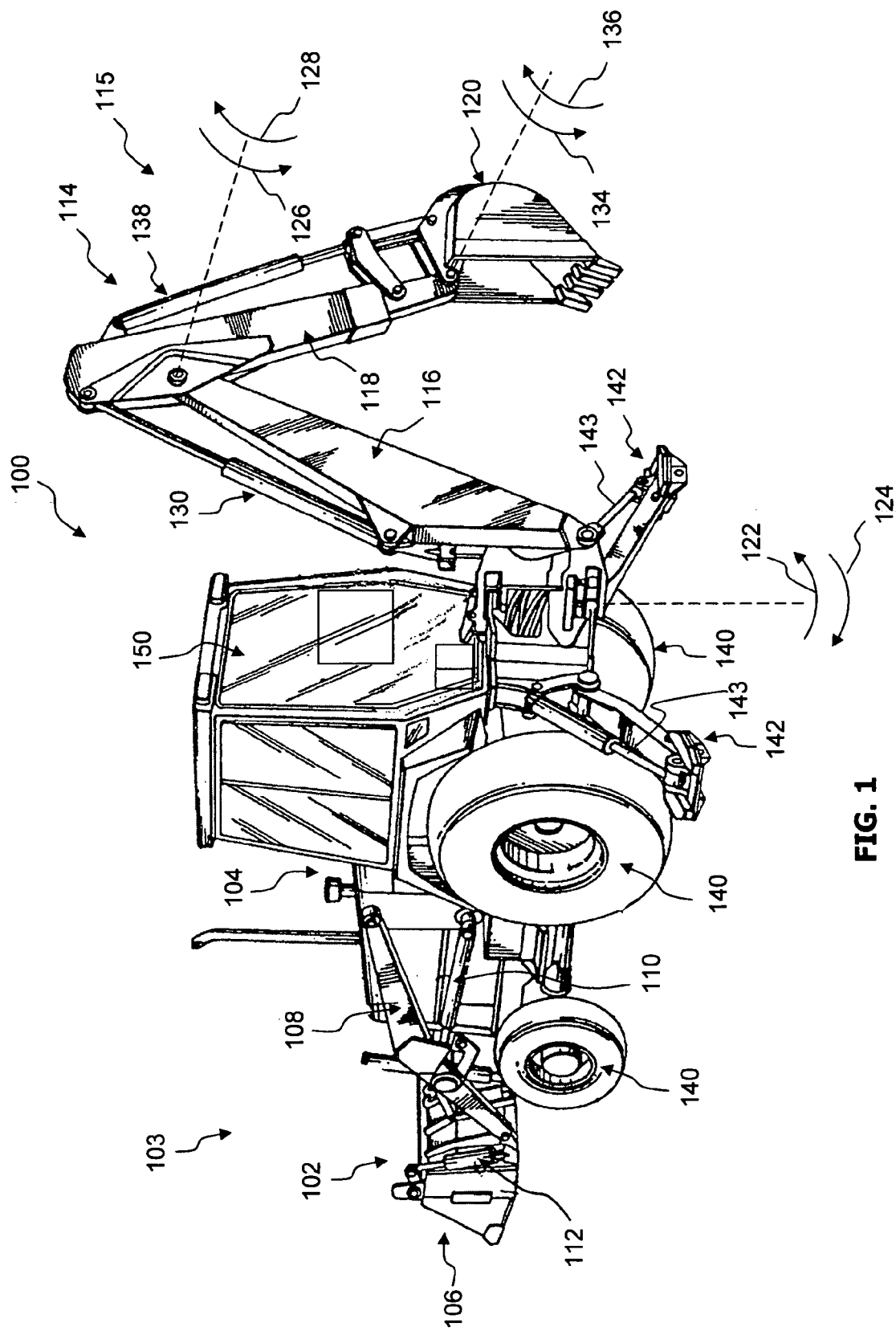
FIG. 1 is a perspective view of an exemplary vehicle.

A vehicle, illustratively a backhoe loader, 100 is shown in FIG. 1. Vehicle 100 is able to perform many different operations relative to the movement of dirt or other materials. For example, a first set of equipment, illustratively a loader, 102 which is coupled to a frame 104 of vehicle 100 may carry materials in a bucket 106 which is coupled to support arms 108 (only one shown). Loader 102 is located at a front portion 103 of vehicle 100. Support arms 108 and bucket 106 may be raised or lowered relative to frame 104 through hydraulic actuators 110 (only one shown) and bucket 106 may be moved relative to support arms 108 by hydraulic actuators 112 (only one shown).

Further, a second set of equipment, illustratively a backhoe, 114 of vehicle 100 may be used to dig trenches and move material through the movement of a boom arm 116, a dipperstick arm 118, and a bucket 120. Backhoe 114 is located at a rear portion 115 of vehicle 100. Bucket 120 is moveably coupled to dipperstick arm 118, which is moveably coupled to boom arm 116 which is moveably coupled to frame 104. Boom arm 116 is rotatable relative to frame 104 in directions 122, 124. The rotation of boom arm 116 in directions 122, 124 being controlled by hydraulic actuators (not shown). Dipperstick arm 118 is rotatable relative to boom arm 116 in directions 126, 128. The rotation of dipperstick arm 118 relative to boom arm 116 in directions 126, 128 being controlled by a hydraulic actuator 130. Bucket 132 is rotatable relative to dipperstick arm 118 in directions 134, 136. The rotation of bucket 132 relative to dipperstick arm 118 in directions 134, 136 is controlled by a hydraulic actuator 138.

Figure 3:
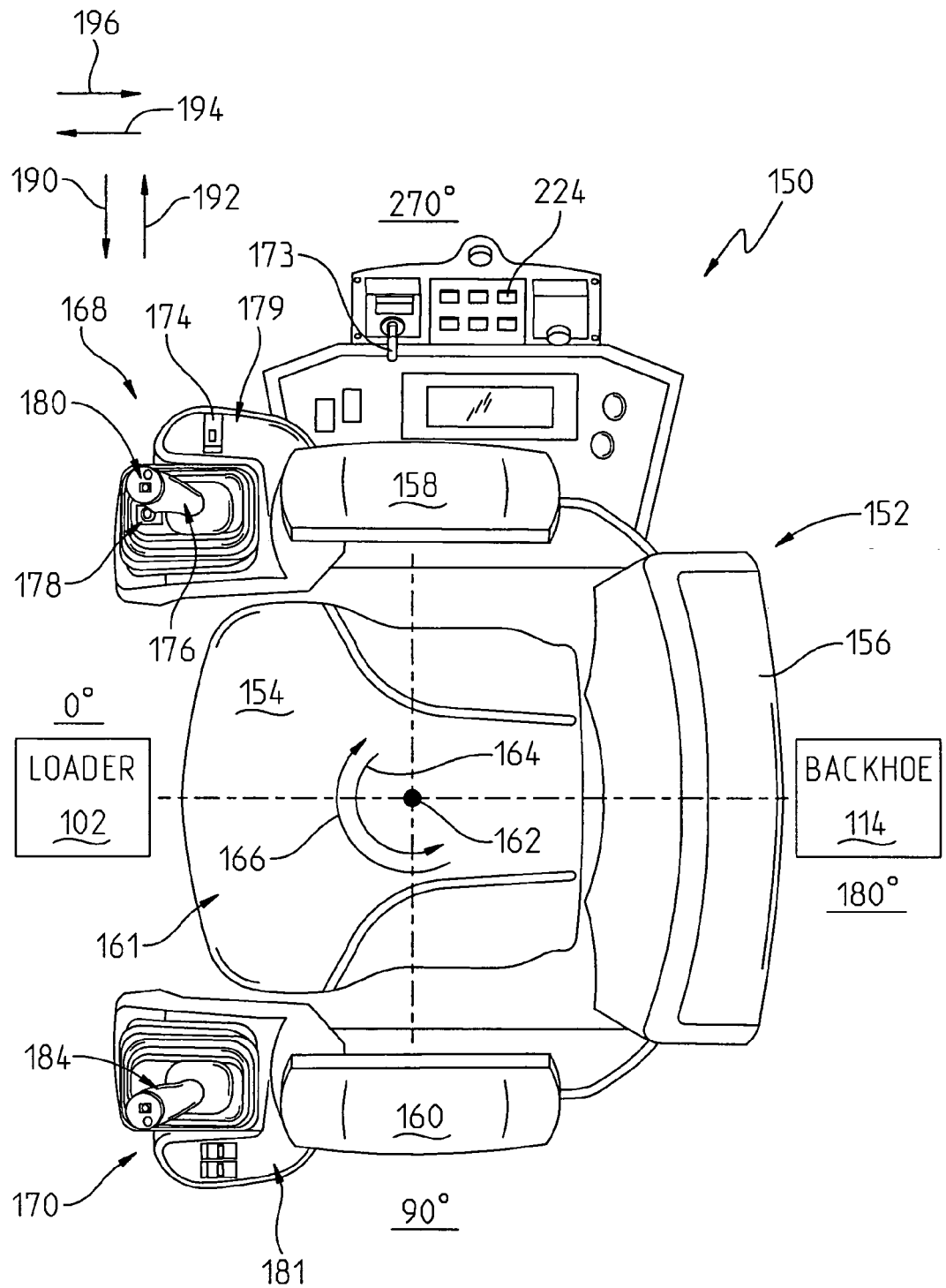
FIG. 3 is a top view of a moveable operator seat in a forward center position.

Frame 104 may be moved about by a plurality of traction devices 140. Further, frame 104 may be stabilized by a plurality of stabilizer arms 142 controlled by actuators 143. Loader 102, backhoe 114, and the movement of vehicle 100 is controlled by an operator positioned within an operator compartment or cab 150. Although operator compartment 150 is shown as an enclosed compartment, operator compartment 150 may be open or partially enclosed. In one embodiment, operator compartment 150 includes a roll over protection system. An exemplary layout of a portion of an interior of operator compartment 150 is shown in FIG. 3 and discussed in more detail herein.

Although a backhoe loader is illustratively shown as an exemplary vehicle 100, the control system 200 disclosed herein may be used with other suitable vehicles which have a first set of equipment 102 to be controlled and a second set of equipment 114 to be controlled. Further, although control system 200 is discussed in the context of controlling hydraulic actuators, such as actuators 110, 112, 130, 138, and 143, control system 200 may be implemented to control other suitable types of systems including pneumatic systems.

Figure 2:
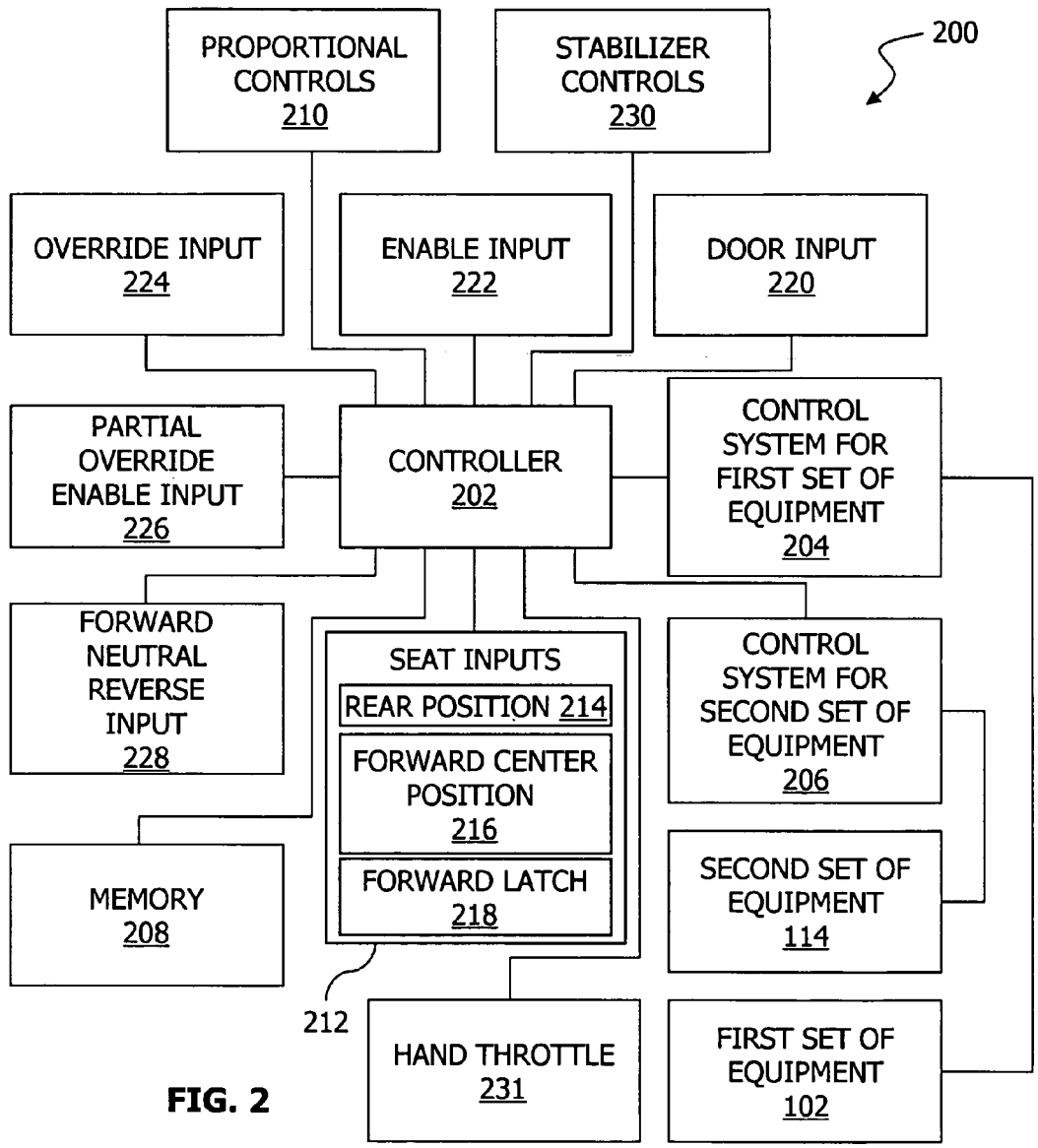
FIG. 2 is a representative view of portions of the exemplary vehicle of FIG. 1.

Referring to FIG. 2, a representation of control system 200 is shown. Control system 200 includes a controller 202 which controls the operation of a control system for the first set of equipment 204 and a control system for the second set of equipment 206. Control systems 204 and 206 control the operation of first set of equipment 102 and second set of equipment 114, respectively. In the illustrated embodiment of FIG. 1 control system 204 is a hydraulic control system and includes hydraulic actuators 110 and 112 and control system 206 is a hydraulic control system and includes hydraulic actuators 130 and 138.

Controller 202 has access to a memory 208 which includes software that determines the operation of control system 204 and control system 206 based on user inputs provided through a plurality of proportional controls 210. Exemplary proportional controls include joysticks, levers, foot pedals, and other suitable proportional controls.

As explained herein, the movement of first set of equipment 102 and second set of equipment 114 through proportional controls 210 is subject to one or more parameters. For example, based on a position of an operator seat 152 (FIG. 3) in operator compartment 150 one of first set of equipment 102 and second set of equipment 114 is disabled. The position of operator seat 152 is monitored through a plurality of seat inputs 212 including a rear position input 214, a forward center position input 216, and a forward latch input 218.

Further, as explained herein, the operation of first set of equipment 102 and second set of equipment 114 through proportional controls 210 is further governed by a door input 220, an enable input 222, an override input 224, a partial override input 226, and/or a forward neutral reverse (FNR) input 228. Exemplary door inputs 220 include various on/off devices, such as a contact switch, a hall effect switch, a reed switch, and other suitable devices. Exemplary FNR inputs 228 include various on/off devices.

Referring to FIG. 3, operator compartment 150 includes operator seat 152. Operator seat 152 includes a seat portion 154, a back portion 156, a right arm rest portion 158 and a left arm rest portion 160. A centerline 161 of operator seat 152 is shown. Operator seat 152 is supported by a floor of operator compartment 150 and swivels about an axis 162 in directions 164 and 166. In the illustrated embodiment, operator seat 152 may swivel from about 0° to about 180°. In one embodiment, operator seat 152 may swivel from about 270°, through 0°, through 180°, up to about 270°.

Figure 4:
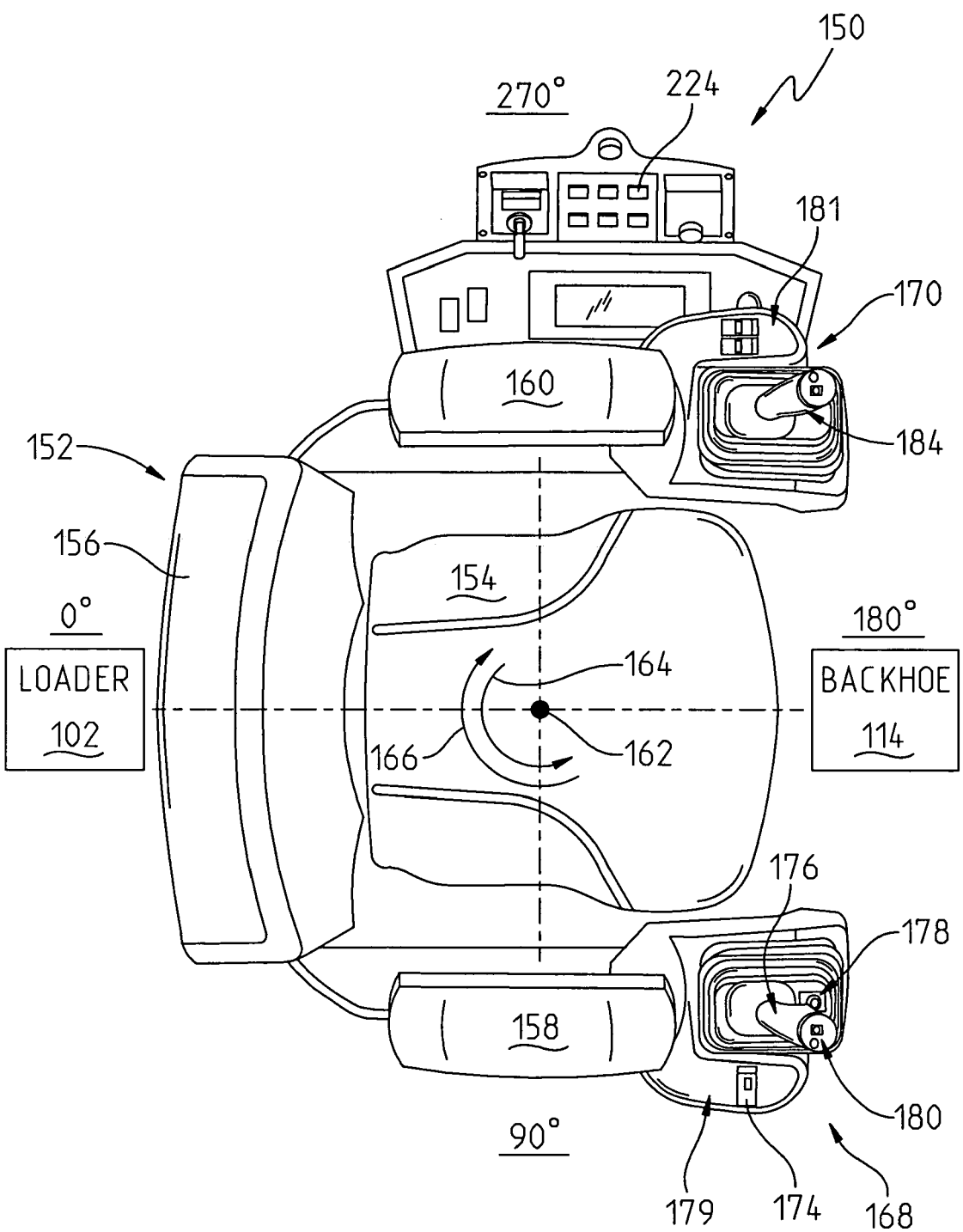
FIG. 4 is a top view of the moveable operator seat of FIG. 3 in a rear position.

As illustrated in FIG. 3, operator seat 152 is in a forward-facing position wherein the operator chair 152 opens towards loader 102 at the front portion 103 of vehicle 100. Forward facing positions range from the 0° position shown in FIG. 1, to positions between 90° and 0°, and if permitted to positions between 270° and 0°. Forward facing positions include a forward center position described herein. Other forward facing positions are referred to herein as forward positions. Referring to FIG. 4, operator seat 152 has rotated about 180° to a rearward-facing position wherein the operator seat 152 opens toward backhoe 114. Rearward facing positions range from the 180° position shown in FIG. 4 to positions between 90° to 180° and if permitted to positions between 180° and 270°. Rearward facing positions are referred to herein as rear positions.

In one embodiment, a forward seat latch (not shown) is provided which positively locates operator seat 152 in the forward center position which corresponds to the 0° position of FIG. 3. Although the forward center position is illustrated at the 0° position, the forward center position generally includes a couple of degrees off of the 0° position. An exemplary seat latch is a lever that interacts with a catch in the swivel mechanism of operator seat 152. To permit the rotation of operator seat 152, the operator reaches down and raises the lever to space apart the lever from the catch. Additional exemplary seat latches include a solenoid operated push button. In one embodiment, seat forward latch input 218 of seat input 212 monitors the forward seat latch to provide an indication that operator seat 152 is in the forward center position of FIG. 3. Exemplary latch inputs 218 include on/off devices.

Forward center position input 216 and rear position input 214 each provide an indication of the position of operator seat 152 and are discussed in connection with FIG. 12 and FIG. 13. Each of forward center position input 216 and rear position input 214 are on/off switches. In one embodiment, forward center position input 216 and rear position input 214 include a spring member that biases the switch in the open position. The forward center position input 216 and rear position input 214 may each be closed by pressing down against a top portion of the switch against the bias of the spring member. Additional exemplary seat position inputs include on/off devices, such as contact switches, reed switches, and hall effect switches.

Figure 13:
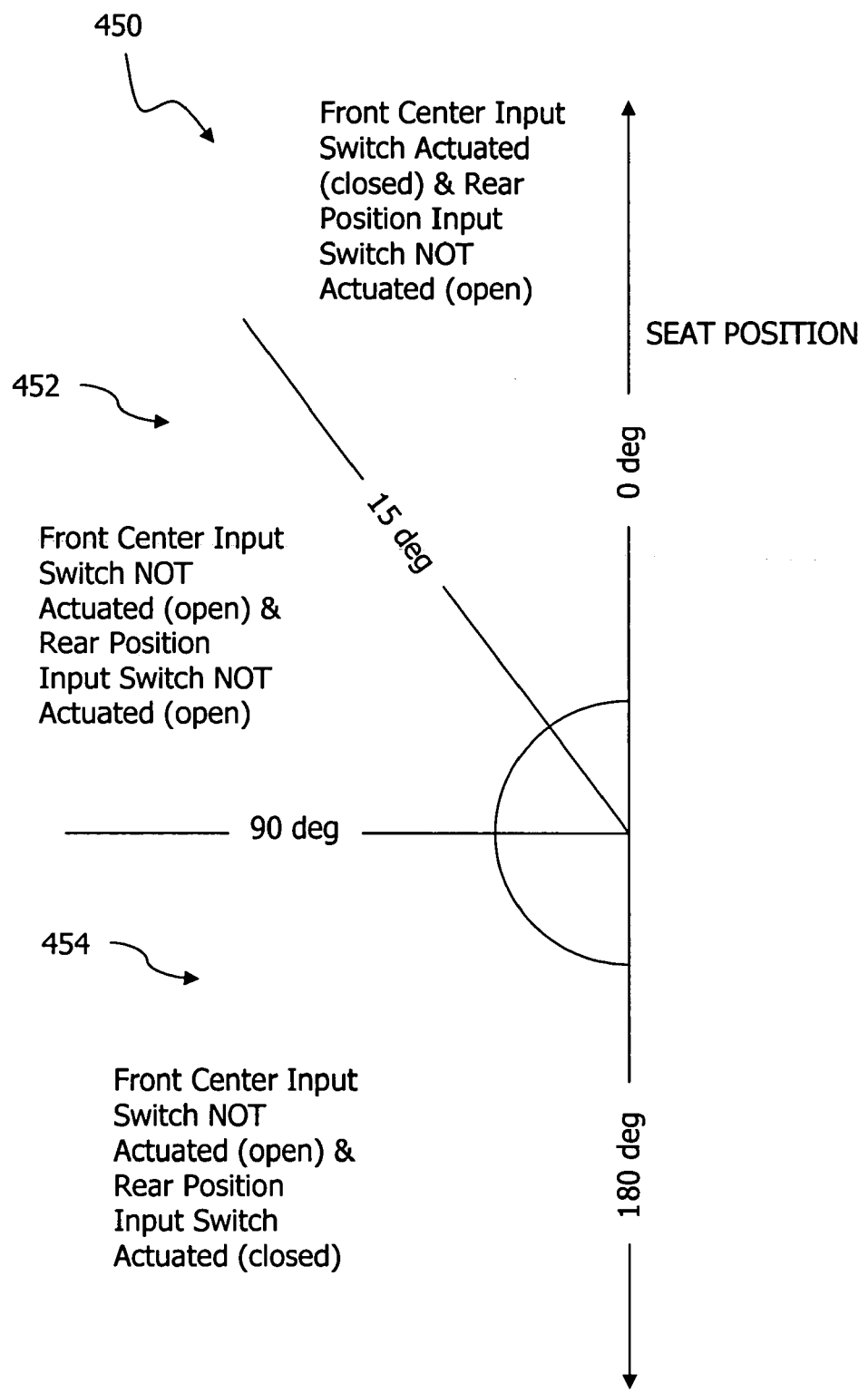
FIG. 13 illustrates various seat positions of the moveable operator seat.

As shown in FIG. 13, in a first region 450 spanning from 0° to 15° the front center position input 216 is closed and rear position input 214 is open. In a second region 452 spanning from 15° to 90°, forward center input 216 is open and rear position input 214 is open. In a third region 454 spanning from 90° to 180°, forward center position input 216 is open and rear position input 214 is closed. As such based on the state of forward center input 216 and rear position input 214, controller 202 may determine whether operators seat 152 is in first region 450, second region 452, or third region 454.

Figure 12:
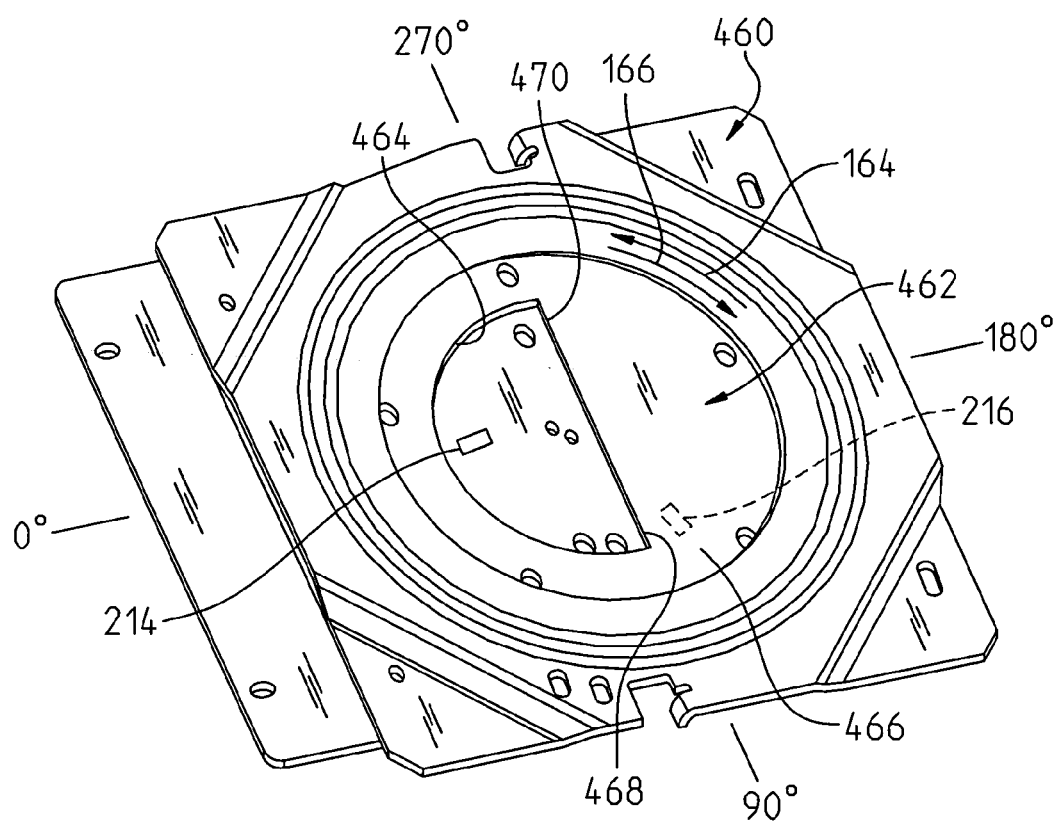
FIG. 12 is a perspective view of a portion of the support of the moveable operator seat.

Referring to FIG. 12, a base plate 460 is shown that is supported by a suspension portion (not shown) of moveable operator seat 152. A plate 462 is mounted to base plate 460 such that plate 462 may rotate in directions 164, 166. In one embodiment a plurality of bearings (not shown) support plate 462 in a rotatable fashion relative to base plate 460. Plate 462 is coupled to seat portion 161. As such, seat portion 161 is rotatable relative to base plate 460.

Plate 462 further includes a cutout portion 464. Forward center position input 216 and rear position input 214 are mounted to base plate 460 generally below rotatable plate 462. Rear position input 214 is shown as being located generally in cutout portion 464 and forward center position input 216 shown as being located generally below a body portion 466 of rotatable plate 462. In the illustrated positions, rear position input 214 is in an open state due to the bias of its spring member and forward center position input 216 is in a closed state due to its top portion being pressed down by body portion 466 against the bias of its spring member. The illustrated position corresponds generally to operator seat 152 being in the orientation shown in FIG. 3.

As operator seat rotates in direction 164 towards the position shown in FIG. 4, cutout portion 464 moves relative to forward center position input 216 and rear position input 214. At about 15°, a leading portion 468 of cutout portion 464 overlaps the position of forward center position input 216 and forward center position input 216 is able to be in an open state, its biased state. At this point operator seat 152 is in region 452 of FIG. 13. By further rotating operator seat 152 in direction 164, rear position input 214 goes past a trailing portion 470 of cutout portion 464 and is positioned under body portion 466 at about 90°. Thus, placing rear position input 214 in a closed state. At this point operator seat 152 is in region 454 of FIG. 13. The operator seat stays in region 454 as operator seat continues on through to the position shown in FIG. 4 due to rear position input being under body portion 466 of plate 462 and forward center position input being in the cutout portion 464 of plate 462.

Forward center position input 216 provides a redundant indication to forward latch input 218 that operator seat 152 is in the forward center position. As such, forward center position input may serve as a feature to make sure that proportional controls 210 are not enabled due to a faulty latch switch.

By using rear position input 214, forward center position input 216, and forward latch input 218, three distinct position groups may be distinguished: rear positions (region 454), forward positions (region 452), and the forward center position (region 450 and latch detected). Based on rear position input 214, controller 202 may determine whether operator seat is in a forward-facing position (forward positions or forward center position) or a rearward-facing position (rear positions). Based on forward center position input 216 and forward latch input 218, controller 202 may determine whether operator seat 152 is in the forward center position or another forward position. As stated herein, forward center input 216 provides a redundant signal to forward latch input 218 to provide a check on whether forward latch input 218 is functioning properly. Proportional controls 210 will not be enabled when the operator seat 152 is in the forward center position unless both forward center position input 216 and forward latch input 218 both indicate that operator seat 152 is in the forward center position.

Forward of right hand arm rest portion 158 and left hand arm rest portion 160 are a right side support 168 and a left side support 170, respectively. Both right side support 168 and left side support 170 are supported by operator seat 152 and rotate with operator seat 152.

Right hand support 168 includes an exemplary enable input 174 corresponding to enable input 222 of FIG. 2. Enable input 174 is a pushbutton switch. Additional exemplary enable inputs include dials, buttons, and any suitable on/off input device. Right hand support 168 further includes two proportional controls 176 and 178 corresponding to proportional controls 210 of FIG. 2. Referring to FIG. 3, proportional controls 176 and 178 are each joysticks which may be moved in a left and right direction (corresponding to directions 190, 192 when operator seat 152 is in the forward center position) and a forward and rearward direction (corresponding to directions 194, 196 when operator seat 152 is in the forward center position). As explained in more detail herein, proportional controls 176 and 178 control one or more functions of loader 102 and backhoe 114. Further, in one embodiment, the specific functions controlled by proportional controls 176 and 178 vary based on the position of operator seat 152.

Figure 5:
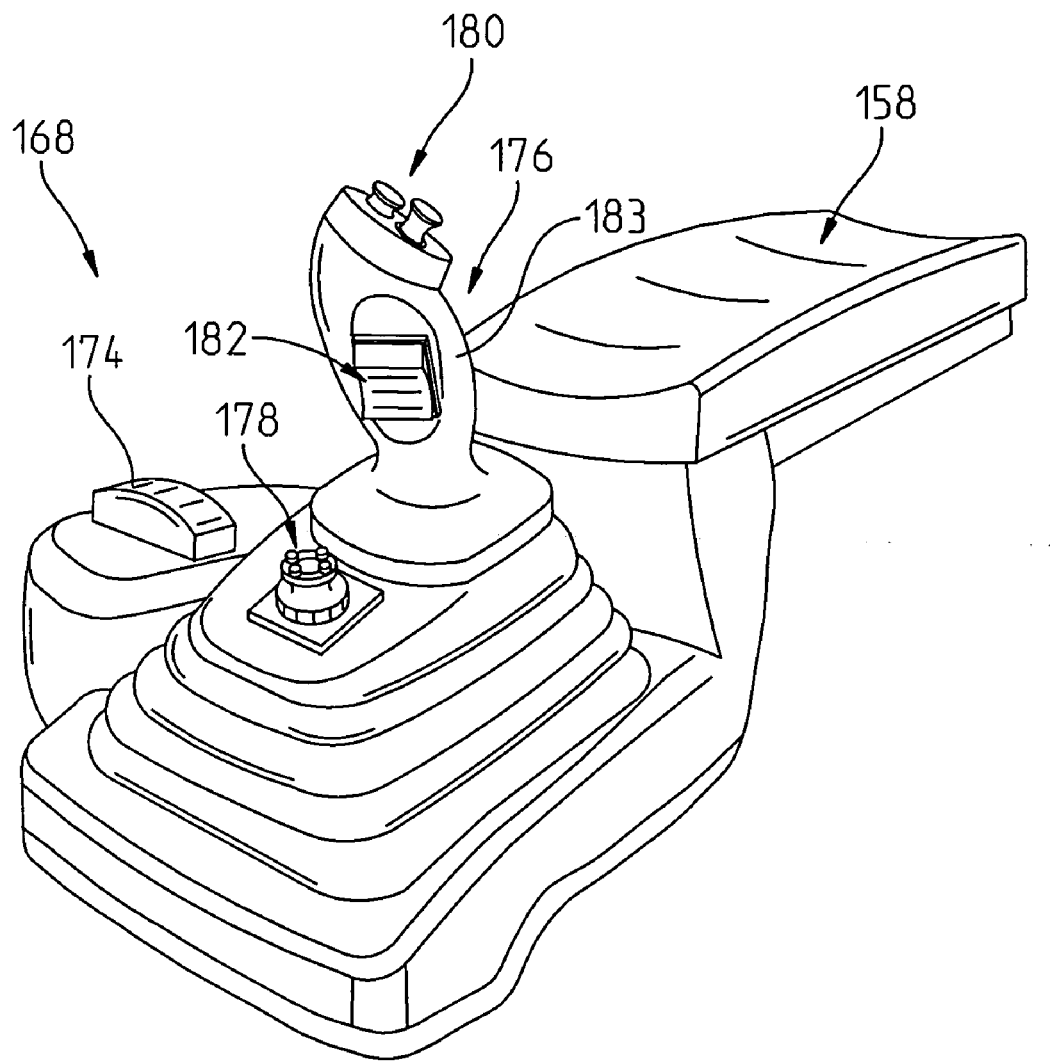
FIG. 5 is a perspective view of a portion of the moveable operator seat of FIG. 3 illustrating a plurality of joystick controls.

As shown in FIG. 5, proportional control 176 includes a plurality of button inputs 180 and a momentary switch input 182 located on a front side of a grip portion 183. Switch input 182 which corresponds to the partial override enable input 226 of FIG. 2. The position of switch input 182 permits a user to actuate switch input 182 while maintaining their grip on grip portion 183 of joystick 176. Further, the relative height of joystick 176 and downward offset of support 168 are chosen to allow a user's arm to rest comfortably on arm rest 158 while gripping joystick 176.

Left hand support 170 includes a proportional control 184 corresponding to proportional controls 210 of FIG. 2. Proportional control 184 is a joystick which may be moved in the same directions as joysticks 176 and 178. As explained in more detail herein, joystick 184 may control one or more functions of loader 102 and backhoe 114. In one embodiment, button inputs 180 and partial override enable input 226 are located on proportional control 184. Further, in one embodiment, the specific functions controlled by joystick 184 vary based the position of operator seat 152.

Figure 6:
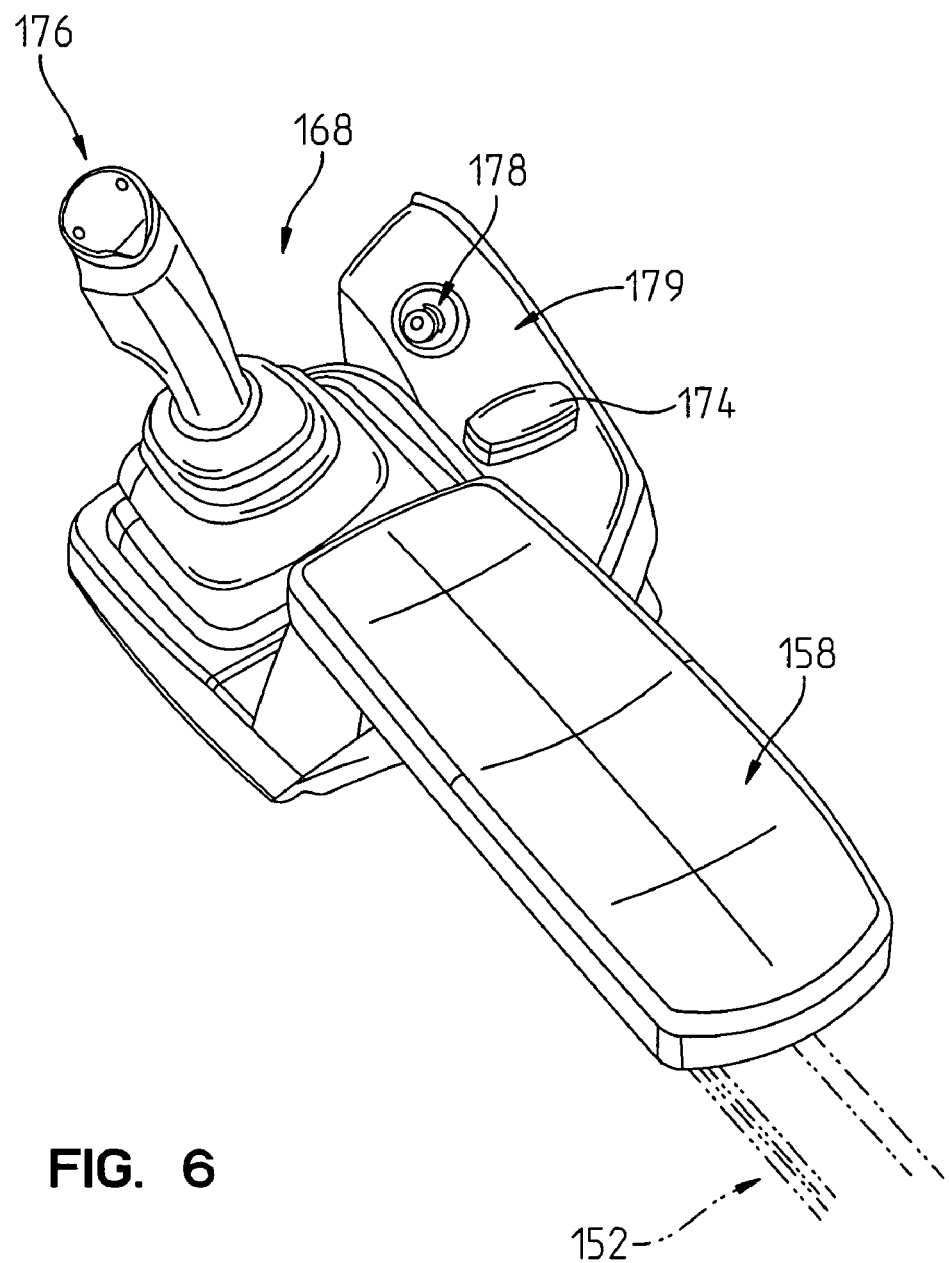
FIG. 6 is a perspective view of an alternative embodiment of the proportional controls.
Figure 7:
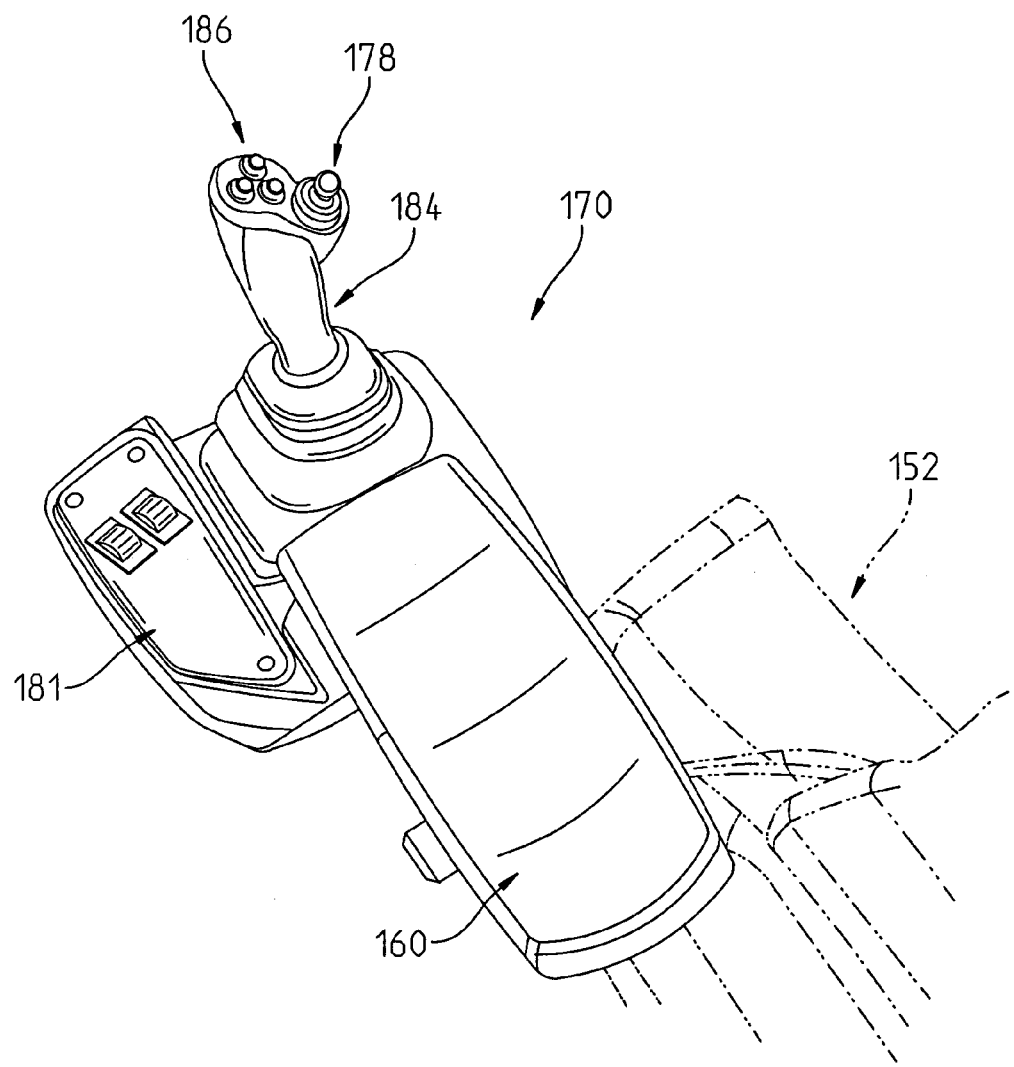
FIG. 7 is a perspective view of another alternative embodiment of proportional controls attached to a left side portion of the moveable operator seat of FIG. 5.

Referring to FIG. 6, in one embodiment, proportional control 178 is provided on a side support 179 of right hand support 168 along with enable switch 174. In another embodiment, proportional control 178 is provided on a side support 181 of left hand support 170. Referring to FIG. 7, in one embodiment, proportional control 178 is provided on an upper portion 186 of proportional control 184. In another embodiment, proportional control 178 is provided on an upper portion of proportional control 176.

Returning to FIG. 2, in one embodiment, the control of first set of equipment 102 and second set of equipment 114 with proportional controls 210 requires the user to actuate the enable input 222. In one embodiment, the control of first set of equipment 102 and second set of equipment 114 with proportional controls 210 is further dependent on at least one other input, such as door input 220 and/or one or more of seat inputs 212.

Figure 8:
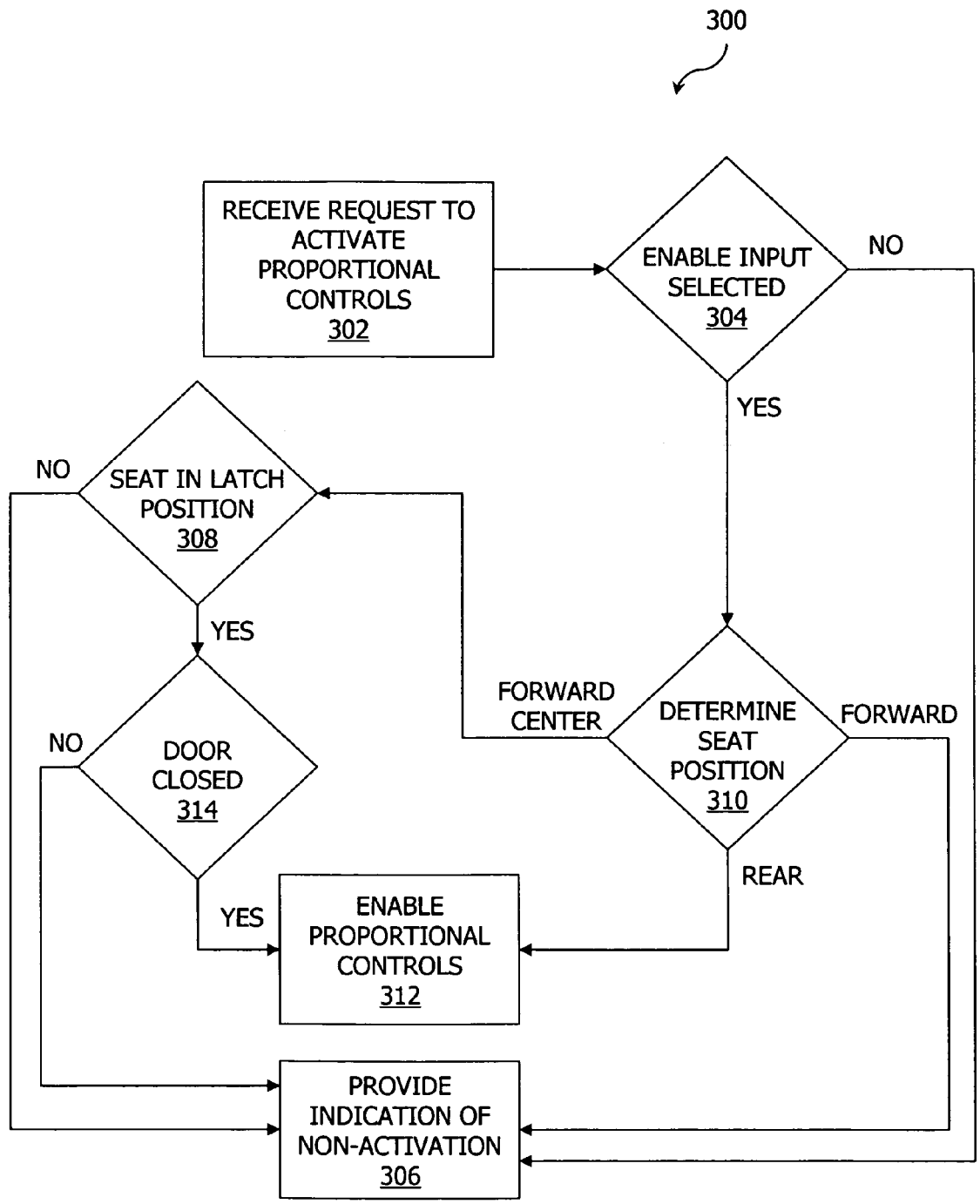
FIG. 8 is an exemplary method of enabling the proportional controls of the work vehicle.

Referring to FIG. 8, an exemplary method 300 of enabling proportional controls 210 is shown. A request to activate at least one of proportional controls 210 is received, as indicated by block 302. A determination is made by controller 202 whether the enable input 222 has been selected, as represented by block 304. In the embodiment wherein enable input 222 is a button 174 (see FIG. 5), enable input 222 is selected by depressing the button. If enable input 222 has not been selected, then an indication is provided to the user of non-activation, as represented by block 306. Exemplary indications include displaying on a display the violation (such as enable input not selected) and/or sounding an audible warning.

Proportional controls may be enabled if operator seat 152 is in a rear position or the forward center position. If enable input 222 has been selected, then a determination is made of the orientation of operator seat 152, as represented by block 310. Controller 202 looks to the status of rear position input 214 and forward center position input 216. If operator seat 152 is in the rear position from about 90° to about 180°, then the proportional controls 210 are enabled, as represented by block 312. Once enabled, proportional controls 210 are used to control the operation of one or more of first set of equipment 102 and second set of equipment 114. If operator seat 152 is in a forward position, then an indication is provided to the user of non-activation, as represented by block 306. If operator seat 152 is in the forward center position, then the status forward latch input 218 is determined, as represented by block 308. If the operator seat 152 is not latched, then an indication is provided to the user of non-activation, as represented by block 306. If the operator seat 152 is latched, then a determination is made whether the door is closed, as represented by block 314. If the door is closed, then proportional controls 210 are enabled. If the door is not closed, then an indication is provided to the user of non-activation, as represented by block 306.

Once proportional controls 210 are enabled, proportional controls 210 may be actuated to control the operation of first set of equipment 102 and second set of equipment 114. Also, various conditions will result in proportional controls 210 being disabled. In one embodiment, unlatching operator seat 152 from the 0° position will disable proportional controls 210. In one embodiment, proportional controls will be automatically re-enabled by placing operator seat 152 in the 0° latched position. In one embodiment, swiveling operator seat 152 from a position greater than 90° to a position less than 90° will disable proportional controls 210. In one embodiment, swiveling operator seat 152 from a position less than 90° to a position greater than 90° will automatically re-enable proportional controls 210.

In one embodiment, control system 200 stores one or more operational parameters in memory 208. These operational parameters were set by the operator while proportional controls 210 were enabled. Control system 200 is configured to set the operational parameters to their stored values upon subsequent re-enabling of proportional controls 210 unless a timeout has occurred. In one embodiment, a timeout corresponds to vehicle 100 being shut down, such as turning a key 173 (see FIG. 3) to an off position. In another embodiment, a timeout corresponds to the expiration of a preset value of a timer monitored by controller 202.

Figure 9:
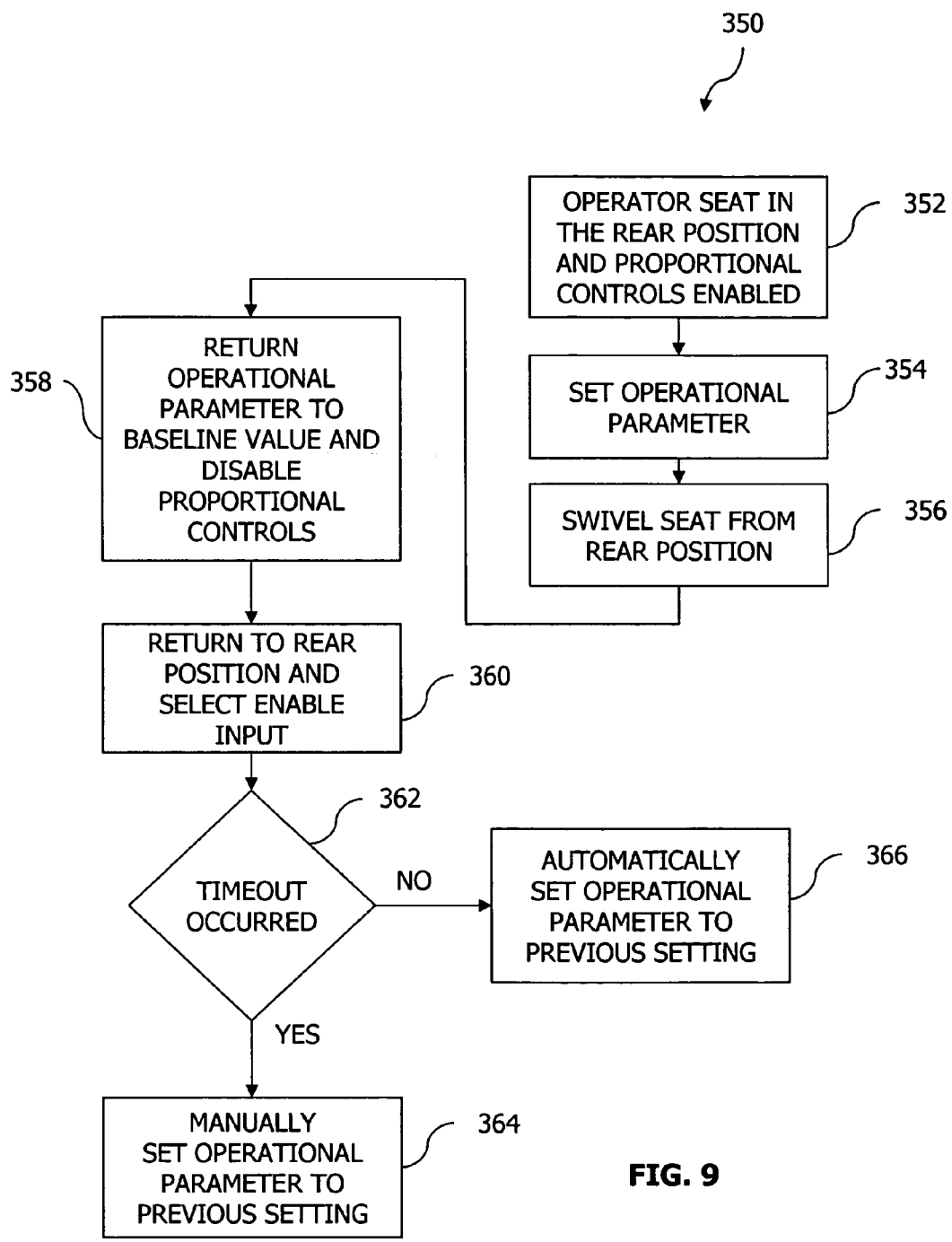
FIG. 9 is an exemplary method of setting a value for an operational parameter of the work vehicle.

Referring to FIG. 9, an exemplary method 350 is shown for the automatic resetting of an operational parameter. It is assumed that the operator has positioned vehicle 100 at a desired location to dig a trench. The method in FIG. 8 corresponds to an operator having positioned operator seat 152 in a rear position, such as FIG. 4, and having enabled proportional controls 210 according to the method 300 of FIG. 7, as represented by block 352. Among other operational parameters the operator would set a hand throttle 231 to a setting to provide constant engine rpm for sufficient hydraulic power while digging with backhoe 114, as represented by block 354. In one embodiment, hand throttle 231 is enabled by placing the forward-neutral-reverse lever in neutral, the hand throttle 231 is dialed to a minimum value, and then positioned at a desired setting. In one example, hand throttle 231 is dialed up to about 2000 rpm.

For some reason, such as to exit vehicle 100 to speak with a co-worker, the operator moves operator seat 152 back to a forward-facing position, as represented by block 356. The movement of operator seat from the rear position results in hand throttle 231 being dropped to reduce engine rpm and proportional controls 210 being disabled, as represented by block 358. The operator completes speaking with the co-worker and positions operator seat 152 back in a rear position, as represented by block 360.

In one embodiment, returning to a rear position does not automatically re-enable proportional controls 210. To re-enable proportional controls 210, the operator must again select enable input 174, also represented by block 360. Controller 202 determines whether a timeout event has occurred, as represented by block 362. In one embodiment, a timeout event occurs when key 173 has been turned to an off position.

As such, it is likely that when a timeout has occurred that a different operator may be present on vehicle 100 or the same operator is present on vehicle 100 after an extended period of time away from operator seat 152. In either case, the operator may not know or remember the settings of the operational parameters set during the previous enablement of proportional controls 210. In contrast, if key 173 has not been turned to an off position, the operator is likely in close proximity to operator seat 152, if not seated in operator seat 152, and remembers the settings of operational parameters set during the previous enablement of proportional controls 210.

Returning to FIG. 8, if a timeout has occurred the operational parameters are manually set by the operator, as represented by block 364. If a timeout has not occurred the operational parameters are automatically reset to the values stored in memory 208 corresponding to prior enablement of proportional controls 210, as represented by block 366.

In addition, hand throttle input 231 may be enabled to provide cruise control when operator seat 152 is in the forward center position. In one embodiment, the engine rpm is the result of a combination of a foot throttle input and hand throttle input 231. Pressing the foot throttle will increase the engine rpm, and letting off the foot throttle will return the engine rpm to the setting of hand throttle 231. Hand throttle 231 will be disabled if a brake pedal is actuated, upon which the engine rpm will be controlled by the foot throttle. Hand throttle 231 may be enabled in a rear facing seat position.

If there is a hardware fault of hand throttle input 231, then vehicle 100 may be operated with the foot throttle input. Likewise, if there is a hardware fault of the foot throttle input, then the vehicle 100 may be operated with hand throttle input 231.

Figure 10:
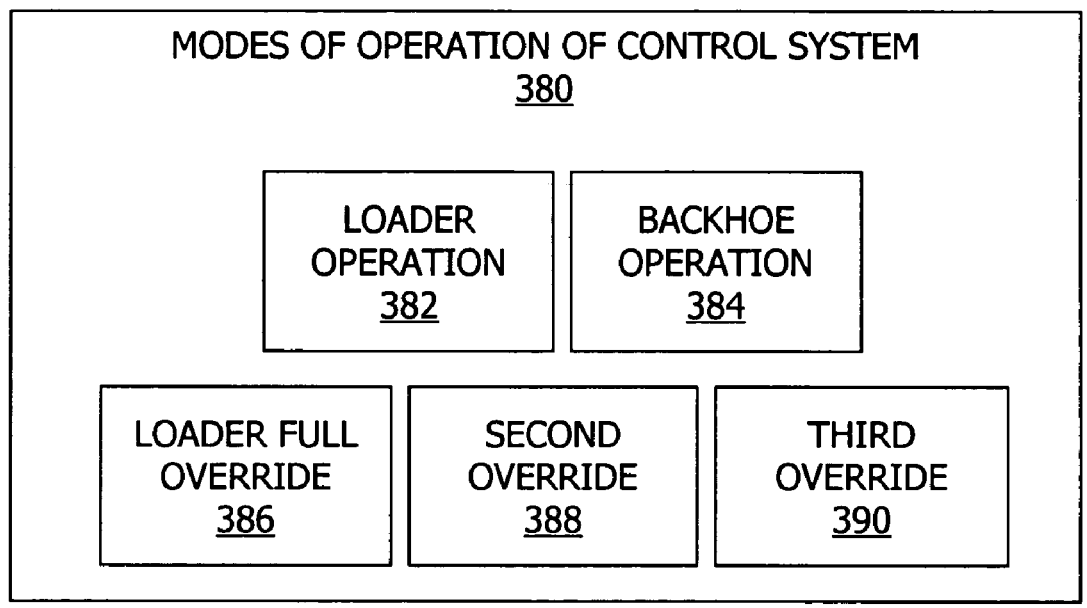
FIG. 10 is a representative view of a plurality of exemplary modes of operation of the vehicle.
Figure 11:
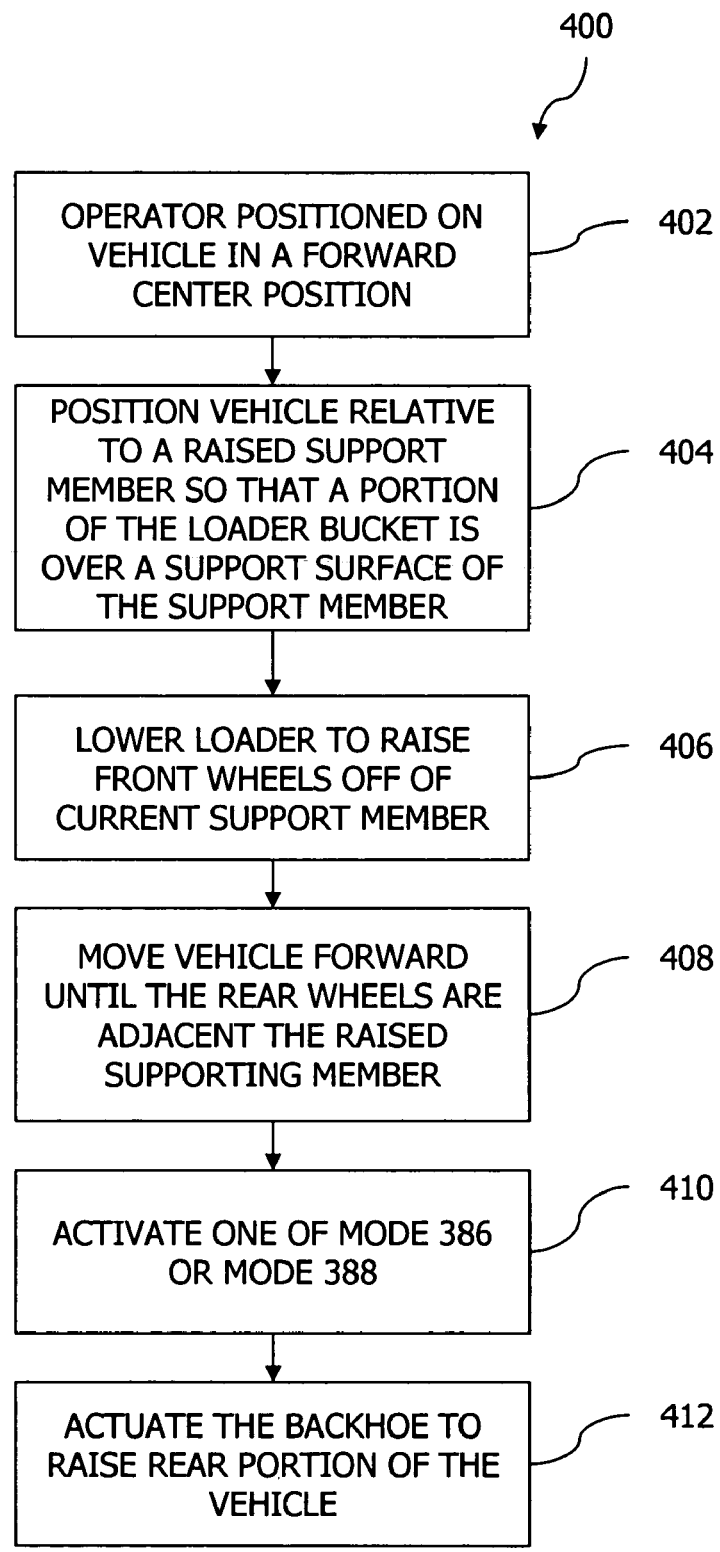
FIG. 11 is an exemplary method of positioning the work vehicle of FIG. 1 on an elevated support.

As explained herein, once enabled proportional controls 210 are used to control various operations of first set of equipment 102 and second set of equipment 114. Referring to FIG. 10, five exemplary modes of operation 380 of control system 200 are provided below.

In a first exemplary mode of operation 382, operator seat 152 is in a forward-facing position (loader position), such as the forward center position shown in FIG. 3. As explained in connection with FIG. 8, in order for proportional controls 210 to be enabled operator seat 152 is to be in a latched forward center position. In first mode of operation 382, the operator controls loader 102 with right joystick 176. By moving joystick 176 left 190 the bucket of loader 102 is curled and by moving joystick 176 right 192 the bucket of loader 102 is dumped. By moving joystick 176 forward 194 the boom of loader 102 is lowered and by moving joystick 176 rearward 196 the boom of loader 102 is raised.

In a second exemplary mode of operation 384, operator seat 152 is in a rearward facing position (backhoe position). As explained in connection with FIG. 8, proportional controls 210 may be enabled when operator seat 152 is in any rear position. In the second mode of operation 384, the operator controls backhoe 114 with right joystick 176 and left joystick 184. controller 202 assigns to right joystick 176 and left joystick 184 one of two of the following control patterns. In one embodiment, the user may select which control pattern to use through an input provided on the sealed switch module which includes override input 224.

In a first exemplary control pattern, moving left joystick 184 to the left of the operator swings backhoe 114 to the left and moving left joystick 184 to the right of the operator swings backhoe 114 to the right. Further, moving left joystick 184 forward away from the operator lowers boom arm 116 and moving left joystick 184 rearward towards the operator raises boom arm 116. Moving right joystick 176 to the left of the operator curls bucket 120 and moving right joystick 176 to the right of the operator dumps bucket 120. Further, moving right joystick 176 forward away from the operator moves arm 118 outward from the operator and moving right joystick 176 rearward towards the operator moves arm 118 inward towards the operator.

In a second exemplary control pattern, moving left joystick 184 to the left of the operator swings backhoe 114 to the left and moving left joystick 184 to the right of the operator swings backhoe 114 to the right. Further, moving left joystick 184 forward away from the operator moves arm 118 outward from the operator and moving left joystick 184 rearward towards the operator moves arm 118 inward towards the operator. Moving right joystick 176 to the left of the operator curls bucket 120 and moving right joystick 176 to the right of the operator dumps bucket 120. Further, moving right joystick 176 forward away from the operator lowers boom arm 116 and moving I right joystick 176 rearward towards the operator raises boom arm 116.

The third through fifth modes of operation 386, 388, 390 are each override modes of operation. First exemplary override mode of operation 386 is identified as the loader full override mode of operation. When operator seat 152 is in the forward center position with proportional controls 210 enabled, the operator may select override input 224 (see FIG. 3). Once override input 224 is selected, control system 200 enables and assigns joysticks 176 and 184 the functionality to control backhoe 114 as discussed in second mode of operation 284. Further, control system 200 enables and assigns joystick 178 the functionality to control loader 102 as discussed in first mode of operation 382. As such, the operator has the full functionality of first mode of operation and second mode of operation while in a forward facing position. The operator may remain seated in operator seat 152 with his hands positioned generally on the joysticks in front of the operator, joysticks 176 and 178 for the right hand and joystick 179 for the left hand, and control both loader 102 and backhoe 114.

Second exemplary override mode of operation 388 is identified as the loader partial override mode of operation. When operator seat 152 is in the forward center position with proportional controls 210 enabled, the operator may select the partial enable override input 226 to activate mode 388. In one embodiment, partial override input 226 is switch 182 in FIG. 5. In one embodiment, switch 182 must be held in to keep control system 200 in mode 388. In one embodiment, switch 182 does not have to be held in to keep control system 200 in mode 388.

Once the partial enable override input 226 is selected, control system 200 activates joystick 184 to control one or more aspects of backhoe 114. In one embodiment, joystick 184 controls the movement of backhoe 114 in directions 122 and 124. This may be useful to move backhoe from an undesired position, such as in traffic. In one embodiment, joystick 184 controls the height of backhoe 114 such that backhoe 114 may be raised or lowered. This may be useful to lower backhoe 114 to provide clearance as the operator drives vehicle 100 through a doorway. In one embodiment, joystick 184 controls the movement of backhoe 114 in directions 122 and 124 and the height of backhoe 114 such that backhoe 114 may be raised or lowered. As such, the operator can control backhoe 114 while in a normal driving situation without contorting himself around. Joystick 176 continues to control the operation of loader 102 as in first mode of operation 382.

Third exemplary override mode of operation 390 is identified as the backhoe override mode of operation. When operator seat 152 is in a rear position with proportional controls 210 enabled, the operator may select override input 224. Once override input 224 is selected, control system 200 enables and assigns joysticks 176 and 184 the functionality to control backhoe 114, as discussed in second mode of operation 284. Further, control system 200 enables and assigns joystick 178 the functionality to control loader 102 as discussed in first mode of operation 382. As such, the operator has the full functionality of first mode of operation 382 and second mode of operation 384 while in a rearward facing position. The operator may remain seated in operator seat 152 with his hands positioned generally on the joysticks in front of the operator, joysticks 176 and 178 for the right hand and joystick 170 for the left hand, and control both loader 102 and backhoe 114.

Since proportional controls 210 remain enabled in the rear position, the operator has more freedom to visually see both loader 102 and backhoe 114 without contorting his body and with keeping his hands on proportional controls 210. In one embodiment, a rate of movement of loader 102 assigned to the movement of joystick 178 is slower than in the first mode of operation 382 to assist in managing controllability of vehicle 100.

As discussed above in connection with the second override mode of operation 388, partial override enable input 226 when selected provides an indication to controller 202 to configure joystick 184 to control various operations of backhoe 114. The second override mode of operation 386 corresponds to operator seat 152 being in a forward position. When operator seat 152 is in a rear facing position, partial override enable input 226 controls an auxiliary function of backhoe 114. Exemplary auxiliary functions include controlling a hydraulic attachment, such as a hammer. As such, partial override enable input 226 changes functionality as a position of operator seat 152 is changed.

In one embodiment, an operator may use either mode 386 or mode 388 to load vehicle 100 onto an elevated support surface, such as a trailer, without using ramps. An exemplary method 400 is shown in FIG. 9.

Referring to FIG. 9, the operator is positioned in operator seat 152 in a forward facing position, the forward center position, as represented by block 402. The operator drives vehicle 100 forward relative to the elevated support member, such as a trailer. Vehicle 100 is positioned so at least a portion of loader 102 is positioned over a support surface of the elevated support member, as represented by block 404. The operator then uses joystick 176 to lower loader 102 and raise front traction devices 140 off of the current supporting member, the ground, to a height that front members 140 may be positioned on the support surface of the elevated support member, the floor of the trailer, as represented by block 406.

The operator continues to advance vehicle 100 forward relative to the elevated support member until rear traction devices 140 are positioned adjacent the elevated support member, as represented by block 408. At this point, front traction devices 140 are either resting on the support surface of the elevated support member or spaced above the support surface of the elevated support member. The operator activates one of modes 386 and 388, as represented by block 410.

The operator then actuates backhoe 114 to raise the rear traction devices 140 relative to the current support member, as represented by block 412. The rear traction devices are brought into contact with the elevated support member, if not currently in contact, and the operator advances vehicle 100 forward relative to the elevated support member. The operator also by activating the appropriate joysticks raises loader 102 and backhoe 114 as vehicle 100 advances to position vehicle 100 relative to the trailer, to bring front traction devices 140 to rest on the elevated support surface and to position backhoe 114 one or above the elevated support surface. As such, an operator may load vehicle 100 onto a trailer without the need for ramps and while actuating only controls that are accessible while facing forward towards loader 102. The operator need not contort their body, but rather may perform the operation in a smooth, coordinated motion.

In one embodiment, a left and right stabilizer control 230 are provided in operator compartment 150. Left and right stabilizer controls 230 control the raising and lowering of stabilizers 142. In one embodiment, stabilizer controls 230 are coupled to operator seat 152 and swing with operator seat 152. In one embodiment, stabilizer controls 230 are not coupled to operator seat 152 and do not swing with operator seat 152. Stabilizer controls 230, like proportional controls 210, are initially enabled by selecting enable input 222 and may be re-enabled by returning to the forward center position or a rear position.

Regardless of the location of stabilizer controls 230, stabilizer controls 230 are operator centric meaning that the left stabilizer control 230 always controls the stabilizer 142 to the left of the operator and the right stabilizer control 230 always controls the stabilizer 142 to the right of the operator. Control system 200 assigns which stabilizer 142 a given stabilizer control 230 controls based upon the position of the operator seat 152. When operator seat 152 faces forward then left stabilizer control 230 controls the stabilizer 142 on the left-hand side of vehicle 100 (closest in FIG. 1). When operator seat 152 faces rearward then left stabilizer control 230 controls the stabilizer 142 on the right-hand side of vehicle 100. Actuating one of the stabilizer controls 230 toward the operator will always move the respective stabilizer 142 up and actuating one of the stabilizer controls 230 away from the operator will always move the respective stabilizer 142 down.

Although the invention has been described in detail with reference to certain preferred embodiments, variations and modifications exist within the spirit and scope of the invention as described and defined in the following claims.

The invention claimed is:

1. A method of operating a moveable vehicle including a moveable operator seat and a plurality of proportional controls to control the operation of a first set of equipment positioned proximate to a front portion of the moveable vehicle and a second set of equipment positioned proximate to a rear portion of the moveable vehicle, the method comprising the steps of:
   activating a first mode of operation wherein at least one of the plurality of proportional controls the first set of equipment when the operator seat is in a first position;
   activating a second mode of operation wherein at least two of the plurality of proportional controls the second set of equipment when the operator seat is in a second position; and
   activating a third mode of operation wherein a first proportional control controls the first set of equipment and a second proportional control and a third proportional control the second set of equipment simultaneously.

2. The method of claim 1, wherein the step of activating a first mode of operation includes the steps of:
   receiving an indication that an enable input has been actuated;
   determining that the moveable operator seat is in a forward center position; and
   determining that a door of the vehicle is closed.

3. The method of claim 2, wherein the step of determining that the moveable operator seat is in the forward center position includes the steps of:
   receiving an indication from a first seat input that the moveable operator seat is in the forward center position; and
   receiving an indication from a second seat input that the moveable operator seat is in the forward center position.

4. The method of claim 1, wherein the step of activating a second mode of operation includes the steps of:
   receiving an indication that an enable input has been actuated; and determining that the moveable operator seat is in a rear position.

5. The method of claim 1, wherein in the first mode of operation the at least one of the plurality of proportional controls a first group of functions of the first set of equipment and in the second mode of operation the at least two of the plurality of proportional controls a second group of functions of the second set of equipment.

6. The method of claim 5, wherein in the third mode of operation the first proportional control, the second proportional control, and the third proportional control maintain the complete functionality of the first mode of operation and the second mode of operation.

7. The method of claim 1, wherein the first mode of operation is activated when the moveable operator seat is in a first position, the first position corresponding to a forward-facing position.

8. The method of claim 7, wherein the second mode of operation is activated when the moveable operator seat is in a second position, the second position corresponding to a rearward-facing position.

9. The method of claim 8, wherein the third mode of operation is activated in response to the actuation of an override input.

10. The method of claim 9, wherein the first proportional control, the second proportional control, and the third proportional control are each supported by the moveable operator seat and travel with the moveable operator seat.

11. The method of claim 7, wherein in the first mode of operation the second proportional control controls the first set of equipment and in the second mode of operation the second proportional control and the third proportional control the second set of equipment.

12. The method of claim 11, further comprising the steps of:
    placing the operator seat in the first position; and
    selecting a first override input to activate the third mode of operation.

13. The method of claim 11, further comprising the steps of:
    placing the operator seat in the first position;
    selecting a second override input to activate a fourth mode of operation wherein the second proportional control controls the first set of equipment and the third proportional control controls the second set of equipment.

14. A method of operating a moveable vehicle including a first set of equipment positioned proximate a front portion of the moveable vehicle and a second set of equipment positioned proximate to a rear portion of the moveable vehicle, the method comprising the steps of:
    providing a moveable operator seat and a plurality of proportional controls supported by the moveable operator seat for travel with the moveable operator seat;
    providing a first mode of operation wherein the plurality of proportional controls are enabled to control a first set of functions related to the first set of equipment;
    providing a second mode of operation wherein the plurality of proportional controls are enabled to control a second set of functions related to the second set of equipment; and
    providing a third mode of operation wherein the plurality of proportional controls are enabled to control both the first set of equipment and the second set of equipment and to maintain the complete functionality controlled by the plurality of proportional controls in the first mode of operation and the second mode of the operation.

15. The method of claim 14, wherein in the first mode of operation a first proportional control controls the first set of equipment, in the second mode of operation the first proportional control and a second proportional control controls the second set of equipment, and in the third mode of operation the first proportional control and the second proportional control controls the second set of equipment and a third proportional control controls the first set of equipment.

16. The method of claim 14, further comprising the step of providing a fourth mode of operation wherein the plurality of proportional controls are enabled to control both the first set of equipment and the second set of equipment, the plurality of proportional controls being enabled to provide less than the complete functionality controlled by the plurality of proportional controls in the first mode of operation and the second mode of the operation.

17. The method of claim 14, wherein the third mode of operation may be activated when the moveable operator seat is in a first position or a second position, the first position being a forward-facing latched position and the second position being a rearward-facing position.

18. The method of claim 17, wherein the first position is a forward center position.

19. The method of claim 17, wherein the first mode of operation may be activated when the moveable operator seat is in the first position and the second mode of operation may be activated when the moveable operator seat is in the second position.

20. A method of operating a moveable vehicle including a first set of equipment positioned proximate a front portion of the moveable vehicle and a second set of equipment positioned proximate to a rear portion of the moveable vehicle, the method comprising the steps of:
    providing a moveable operator seat and a plurality of proportional controls supported by the moveable operator seat for travel with the moveable operator seat;
    determining based on inputs from a plurality of seat inputs a position of the moveable operator seat;
    enabling a first mode of operation wherein the plurality of proportional controls are enabled to control a first set of functions related to the first set of equipment, in response to receiving an indication that an enable input has been actuated, receiving an indication from a first seat input that the moveable operator seat is in the forward center position, receiving an indication from a second seat input that the moveable operator seat is in the forward center position, and receiving an indication that a door of the vehicle is closed; and
    enabling a second mode of operation wherein the plurality of proportional controls are enabled to control a second set of functions related to the second set of equipment in response to receiving an indication that an enable input has been actuated and receiving an indication that the moveable operator seat is in a rear position.

21. The method of claim 20, further comprising the step of enabling a third mode of operation wherein the plurality of proportional controls are enabled to control both the first set of equipment and the second set of equipment and to maintain the complete functionality controlled by the plurality of proportional controls in the first mode of operation and the second mode of the operation in response to receiving an override input and determining that the moveable operator seat is in one of the forward center position and the rear position.

* * * * *